United States Patent [19]

Schmidt et al.

[11] Patent Number: 4,821,514

[45] Date of Patent: Apr. 18, 1989

[54] PRESSURE FLOW COMPENSATING CONTROL CIRCUIT

[75] Inventors: Randy P. Schmidt; Steven G. Brandau; James A. Miller, all of Cedar Falls, Iowa; Dwight B. Stephenson, Savage, Minn.

[73] Assignee: Deere & Company, Moline, Ill.

[21] Appl. No.: 96,418

[22] Filed: Sep. 11, 1987

Related U.S. Application Data

[63] Continuation-in-part of Ser. No. 060,150, Jun. 9, 1987.

[51] Int. Cl.⁴ ............................................. F04B 49/00
[52] U.S. Cl. ........................................ 60/452; 60/445; 417/218
[58] Field of Search ............... 417/213, 218, 219, 220, 417/221, 222; 60/445, 450, 452; 137/596, 596.13

[56] References Cited

U.S. PATENT DOCUMENTS

| | | |
|---|---|---|
| 3,002,462 | 10/1961 | Raymond . |
| 3,865,514 | 2/1975 | Lonnemo ................. 60/452 X |
| 3,995,425 | 12/1976 | Wittren ..................... 60/445 |
| 4,022,023 | 5/1977 | Inaba et al. . |
| 4,065,922 | 1/1978 | Ott et al. ..................... 60/461 X |
| 4,293,284 | 10/1981 | Carlson et al. . |
| 4,481,770 | 11/1984 | Lohbauer et al. ............. 60/452 |
| 4,648,803 | 3/1987 | Stephenson et al. . |

FOREIGN PATENT DOCUMENTS

| | | |
|---|---|---|
| 1924417 | 5/1969 | Fed. Rep. of Germany . |
| 2422480 | 11/1975 | Fed. Rep. of Germany . |
| 1553259 | 12/1968 | France . |
| 2385917 | 3/1977 | France . |
| 2083249 | 3/1982 | United Kingdom . |

*Primary Examiner*—Edward K. Look

[57] ABSTRACT

A control circuit and specific embodiments thereof are provided using a four-port infinitely variable pilot operated pressure-compensator spool valve and a three-port infinitely variable pilot operated load sense spool valve in series to regulate the output pressure of a variable displacement radial piston pump. The valves are so constructed that both must be correctly positioned to put the pump into full stroke, while either valve can de-stroke the pump. The three-port valve is pilot controlled between the load sense pressure and the outlet pressure, while the four-port valve is controlled between the pump inlet and outlet pressures. A check valve and orifice are positioned between the two control valves and the crankcase control line of the pump to assist in stabilizing the pump output. A relief valve is provided on the crankcase line to minimize output spikes. In an alternative embodiment, a single three-port valve is controlled between the inlet and outlet pressures of the pump. A relief valve is provided to vent spikes in the crankcase pressure, allowing down-sizing of the crankcase orifice.

20 Claims, 3 Drawing Sheets

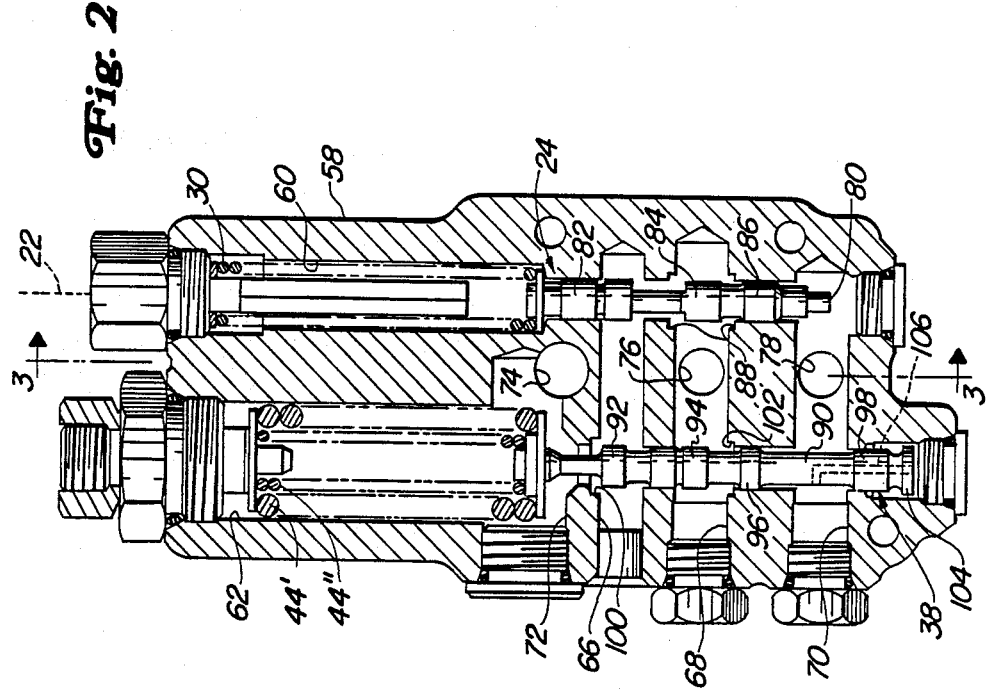

PRESSURE FLOW COMPENSATING CONTROL CIRCUIT

CASE HISTORY

This is a continuation-in-part of U.S. application Ser. No. 060,150, pending filed June 9, 1987.

BACKGROUND OF THE INVENTION

1. Field of the Invention

The present invention relates to control valves for variable displacement pumps, and in particular for variable displacement radial piston pumps.

2. Description of the Related Art

Variable displacement radial piston pumps are useful in situations where the hydraulic demand on a system varies widely. The displacement of such pumps can be made to vary according to the pressure of hydraulic fluid in the pump crankcase, with the displacement increasing as the crankcase pressure decreases, and vice-versa. The pumps have the distinct advantage that they can be throttled back in low demand situations, thereby reducing their power consumption. Further details can be found in U.S. Pat. No. 3,002,462 (Raymond).

Unfortunately, these pumps have the disadvantage that they are inherently unstable, and this instability must be compensated for by the control circuitry for the pump. In particular, the pump increases stroke (flow) faster than it decreases stroke, because in order to decrease stroke the cam operating the pistons must make one complete revolution before the pump output flow is reduced. This built-in delay can cause significant feedback problems if appropriate control circuitry is not used.

One example of such control circuitry is found in U.S. Pat. No. 4,648,803 (Stephenson et al.). Stephenson et al.'s circuitry compensates for most of the inherent instability of the pump, but still leaves something to be desired. Stephenson et al.'s control valve adjusts its position based on the pressure differential between the pump crankcase and the pump outlet. When the outlet pressure peaks quickly, a sharp spike occurs in the crankcase and outlet pressures.

In Stephenson et al.'s circuit, this spike must be drained through the crankcase orifice. This means the crankcase orifice must be sized quite large to accommodate the spike, resulting in constant power drains due to the flow through the orifice in non-spike conditions.

In addition, Stephenson et al. provide a position IV in their main control valve to compensate for extreme spikes. However, the spikes required to move the control valve into this position IV are quite strong. The more normal spikes must be drained through the crankcase orifice.

SUMMARY OF THE INVENTION

The purpose of the present invention is to provide a control circuit having increased stability and a consequent lower probability of interaction with other hydraulic components. The further purpose of the invention is to provide such a circuit in a compact package having an excellent dynamic frequency response.

According to the present invention, a four-port pressure-compensator spool valve is provided biased between the pump inlet and pump outlet pressures. A three-port load sense spool valve also is provided partially in series with the pressure-compensator valve and biased between a load sense pressure and the pump outlet pressure. A check valve and orifice are connected in parallel between the two spool valves and the pump crankcase. Finally, a relief valve is provided between the inlet line and the control valve side of the check valve and orifice.

The pump can be de-stroked by either spool valve alone, but can be put into stroke only if both spool valves are in the correct position. Crankcase pressure spikes are drained through the relief valve to the inlet line, thereby minimizing oscillation due to the spikes. The crankcase orifice can be significantly reduced, since spikes are drained through this relief valve. Of course, in some situations it may be preferable to use both the relief valve of the present invention and an oversized orifice.

Alternatively, a simpler circuit according to the present invention uses a three-port pilot operated pressure-compensator spool valve and the crankcase relief valve, but omits the three-port load sense spool valve, check valve and orifice. Crankcase pressure spikes again are relieved through the relief valve, so that the crankcase orifice can be significantly reduced in size. In addition, the pressure-compensator spool valve is biased between the pup inlet and outlet pressures rather than the pump crankcase and outlet pressures, as taught by Stephenson et al., resulting in a significant improvement in stability.

BRIEF DESCRIPTION OF THE DRAWINGS

These and other advantages of the present invention will be described in further detail with reference to the following drawings:

FIG. 2 is a cross-section of a valve embodying a portion of the schematic of FIG. 1.

FIG. 3 is a cross-section of the valve of FIG. 2 along the line 3—3 in FIG. 2.

FIG. 4 is a detail of the check-orifice valve taken along line 4—4 in FIG. 3.

DETAILED DESCRIPTION OF THE PREFERRED EMBODIMENTS

Figure 1:
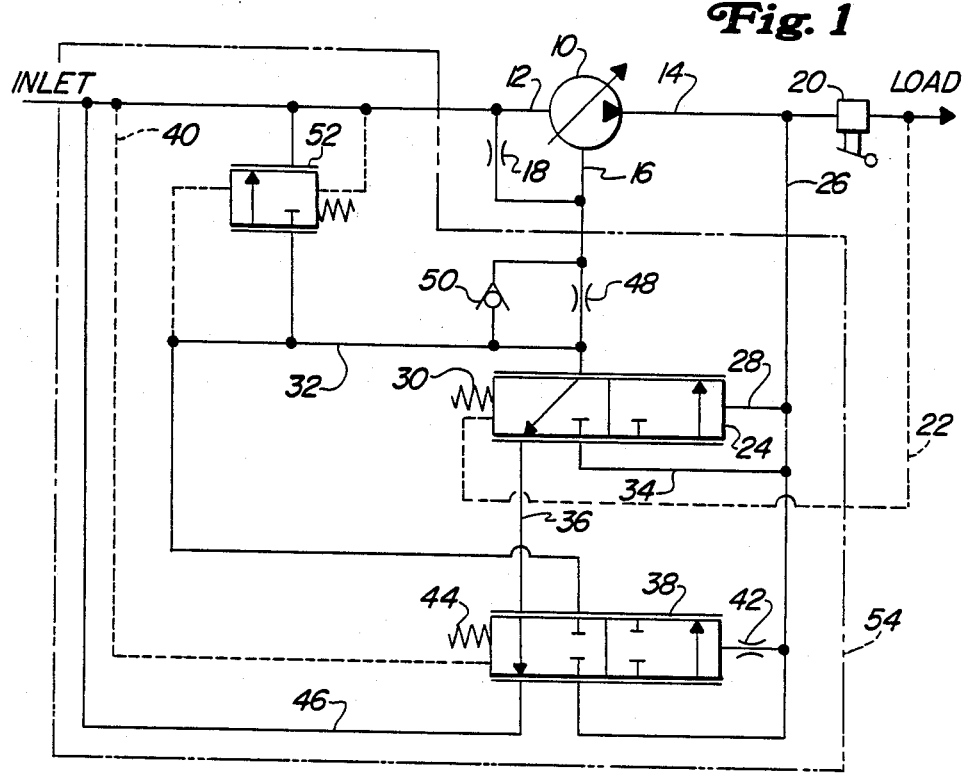
FIG. 1 is a schematic of one embodiment of a circuit according to the present invention.

Referring to FIG. 1, a variable displacement radial piston pump 10 has an inlet line 12 and an outlet line 14. Pump displacement is controlled by the pressure at the control or crankcase line 16, with the displacement increasing as the crankcase line pressure decreases, and vice-versa. Details of such a pump may be found, for example, in U.S. Pat. No. 3,002,462 (Raymond).

The pump housing also normally includes a crankcase orifice 18 connecting the crankcase line 16 with the inlet line 12. Hydraulic fluid tends to leak past the pistons of the pump into the crankcase. The crankcase orifice 18 serves to drain the crankcase to the inlet, thereby preventing undesired pressurization of the crankcase and destroking of the pump. One advantage of the circuit according to the present invention is that this crankcase orifice can be sized to match anticipated leakage past the pistons, and need not be oversized as taught by Stephenson et al.

The outlet line 14 is connected to a load (not shown) through a control valve 20 in the usual manner. The pressure in outlet line 14 is applied via lines 26 and 28 to the one end of an infinitely variable three-port pilot operated load sense spool valve 24.

A sensed load pressure is returned via a load sense line 22 and applied to the other end of the load sense spool valve 24. Preferred conventional circuits, such as that shown in U.S. Pat. No. 4,463,558 (Miller et al.), teach reducing the pressure in such a load sense line when there is no demand.

The load sense valve 24 is biased by spring 30 towards the end connected to the outlet pressure. The load sense valve 24 can connect line 32 to line 34, which is connected to the outlet line 14 via line 26, or to a line 36.

Line 36 connects the load sense valve 24 to an infinitely variable four-port pilot operated pressure-compensator spool valve 38. One end of pressure-compensator valve 38 is controlled by the pressure in inlet line 12 via line 40, while the other end is controlled by the pressure in outlet line 14 via line 26 and orifice 42. The pressure-compensator valve 38 is biased towards the orifice 42 by spring 44.

The pressure-compensator valve 38 can selectively interconnect or disconnect line 36 and inlet line 12 via line 46. Pressure-compensator valve 38 simultaneously can selectively connect or disconnect lines 26 and 32. The valve is so structured that when the lines 36 and 46 are connected, lines 26 and 32 are disconnected, while lines 26 and 32 are connected when lines 36 and 46 are disconnected.

Line 32 is connected to crankcase line 16 via an orifice 48 and a check valve 50 mounted in parallel. Check valve 50 prevents flow therethrough from line 32 towards line 16, while allowing flow from line 16 to line 32.

Finally, an infinitely variable crankcase relief valve 52 is connected between line 32 and inlet line 12. The relief valve 52 is controlled by the pressure differential between lines 32 and 12, and is biased to a close position.

FIGS. 2-4 illustrate a compact valve structure embodying the circuit set forth within the dashed lines 54 in the schematic of FIG. 1. Referring to FIG. 2, the spool valve in the right of the drawing is the three-port load sense valve 24, while the spool valve on the left is the four-port pressure-compensator valve 38. Referring to FIG. 3, the spool valve depicted is the relief valve 52. The check-orifice valve 56 depicted in FIG. 3, and in more detail in FIG. 4, combines the functions of the orifice 48 and check valve 50 into a single element.

Referring to FIGS. 2 and 3 in more detail, valve body 58 is provided with three substantially parallel bores 60, 62, 64 arranged in a triangle with bore 64 approximately centrally spaced and adjacent to the two bores 60, 62. Bore 60 serves as a bore for the load sense valve 24, bore 62 as the bore for the pressure-compensator valve 38 and bore 64 as the bore for the relief valve 52.

A blind bore 66, crankcase bore 68, and outlet bore 70 interconnect the load sense bore 60 and the pressure-compensator bore 62. An inlet bore 72 also connects to the pressure-compensator bore 62.

As best seen in FIG. 3, additional bores are provided substantially orthogonally to the previously mentioned bores. In particular, inlet line bore 74 connects inlet bore 72 with inlet line 12. Crankcase line bore 76 connects crankcase bore 68 with crankcase line 16 ia the check-orifice valve 56, described in more detail below. Finally, outlet line bore 78 connects outlet bore 70 with outlet line 14. In addition, inlet line bore 74 and crankcase line bore 76 each connect to relief valve bore 64.

Referring again to FIG. 2, the final external connection to the valve body 58 is of load sense line 22, which connects to the valve at the top end of load sense valve bore 60.

Load sense bore 60 contains a spool 80 having three lands 82, 84, 86. The outer diameter of the lands 82, 84, 86 are sized to sealingly engage the inner surface of the bore 60, except for the bottom end of the land 86, which is of slightly smaller diameter than the bore 60. In addition, notches 88 are provided in the bore 60 on either side of the crankcase bore 68. The spool 80 is biased to the bottom in the bore 60 by spring 30.

Pressure-compensator bore 62 also contains a spool 90 having lands 92, 94, 96, 98. Lands 92, 94, 96, 98 are sized to engage the inner surface of bore 62, except at notches 100, 102 formed in bore 62 immediately above blind bore 66 and below crankcase bore 68, respectively. Spool 90 is provided with a stop 104 at the bottom end thereof to prevent the spool from moving too far up. A narrow orifice passage 106 is formed in the spool 90 connecting outlet bore 70 to the bottom end of the spool 90, thereby serving the same function as orifice 42 in FIG. 1. Spool 90 is biased to the bottom in FIG. 2 by springs 44', 44". The springs 44', 44" preferably are mounted in an adjustable fashion to allow adjustment of the pre-load bias of the spool 90.

Referring to FIG. 3, relief bore 64 is provided with a spool 108 having a land 110 formed thereon for engaging the inner circumference of bore 64, except at metering notch 111 formed in bore 64 immediately to the right of bore 74. The relief spool 108 is biased to the bottom in the figure by spring 112.

Referring to FIGS. 3 and 4, the check-orifice valve 56 is formed by a main body 112 having legs 114 extending therefrom. When the flow is towards lines 16, the legs 114 are pushed forward to allow unimpeded flow around the edges thereof. In contrast, when the flow is from line 16, the legs 114 are pushed against the shoulders 116 formed in the crankcase line bore 76 to seal the edges thereof. Flow then can occur only between the legs 114 and the walls of the bore 76, which thus together act as an orifice.

The operation of the valve according to the first embodiment of the present invention will now be described initially with reference to FIG. 1 and then to details in FIGS. 2-4. Assume as an initial condition a high volume of flow to the load, e.g., a situation in which a hydraulic cylinder is extended quickly. In this situation, the pressure in both the outlet line 14 and the load sense line 22 will be relatively low. As a result, the main force operating on load sense valve 24 will be the spring 30, moving the valve 24 into the position shown in FIG. 1 connecting lines 32 and 36. Since the outlet pressure is low, the combined forces of the pressure in line 40 and spring 44 will move the pressure-compensator valve 38 to the right as shown in FIG. 1, thereby connecting lines 36 and 46. This will result in de-pressurization of the pump crankcase by flow through crankcase line 16, check valve 50, line 32, line 36 and line 46 to the inlet line 12. De-pressurization of the crankcase increases the displacement of the pump, which is desired in this high flow condition.

Next, assume the pressure at the load increases, e.g., the hydraulic cylinder approaches its end. The load sense pressure and, shortly thereafter, the outlet pressure will increase. The increase in load sense pressure will precede the increase in the outlet pressure, and, in any event, the outlet pressure will not exceed the load sense pressure, so the load sense valve 24 will remain in the position shown in FIG. 1. In contrast, the increased outlet pressure will gradually move the pressure-compensator valve 38 to the left as shown in the figure. This will restrict the flow of fluid from the crankcase via line 36, while simultaneously connecting the outlet to the crankcase via lines 26 and 32. As the connection from line 36 to 46 steadily decreases, the back pressure through line 16 will increase, at least partially de-stroking the pump.

If the load now stabilizes, e.g., if the hydraulic cylinder stops moving, the normal circuit arrangement for the load sense line will provide a means for reducing the pressure in the load sense line 22, see, e.g., U.S. Pat. No. 4,463,558 (Miller et al.). The outlet line pressure now will easily overcome the pressure of the spring 30, shifting the load sense valve 24 to the left in FIG. 1. This will connect the pump outlet to the crankcase line 16 via lines 34, 32 and orifice 48. The pump crankcase then will fill with fluid, completing the de-stroking of the pump. This position is stable, with the pump maintaining just the outlet pressure needed to overcome the spring 30.

Now, assume a new rise in load demand. The outlet pressure again will drop, so that the spring 30 can shift the valve 24 to the right to the position shown in FIG. 1. Similarly, a drop of the pressure through orifice 42 will allow the valve 38 to shift to the right as shown in FIG. 1, again allowing the pump to come into stroke, and the cycle is completed.

In the foregoing cycle, if at any time the load sense and/or outlet pressure increase quickly, e.g., if a hydraulic cylinder is moved with all valves fully open all the way to its end and suddenly stops, a high pressure spike will occur in line 32. In the past, this high pressure spike could be drained only through crankcase orifice 18, which required large diameters for the crankcase orifice 18. The present invention overcomes this wasteful sizing by providing a relief valve 52. With this valve, if the pressure in line 32 rises beyond a desirable maximum, it is quickly relieved to the inlet line 12.

Referring to FIGS. 2 and 3, the pressure in inlet bore 72 is the same as the pressure in inlet line 12 to which it is connected. Similarly, the pressure in crankcase bore 68 is the same as the pressure in crankcase line 16 and the pressure in outlet bore 70 is the same as the pressure in outlet line 14. The load sense pressure is applied directly from line 22 to the top end of the spool 80. The outlet pressure is applied to the bottom of the spool 80 directly in the outlet bore 70. The inlet pressure is applied to the top end of the spool 90 in the inlet bore 72, while the outlet pressure is applied to the bottom end of the spool 90 via the narrow orifice passage 106. The desired metering to create infinitely variable valves is provided by the notches in the respective lands and spool bores.

Figure 5:
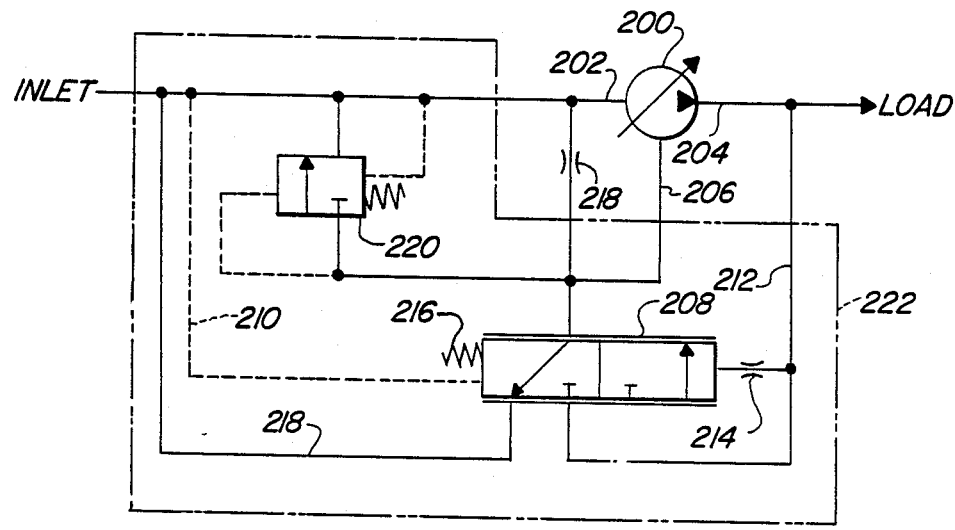
FIG. 5 is a schematic of an alternative embodiment of a circuit according to the present invention.

FIG. 5 depicts an alternative embodiment of the circuit according to the present invention. A variable displacement radial piston pump 200 has an inlet line 202, an outlet line 204 and a crankcase line 206. The pump 200 is provided with a control circuit including an infinitely variable three-port pilot operated pressure-compensator spool valve 208. The pressure in inlet line 202 is applied to one end of the pressure-compensator valve 208 via line 210, while the pressure in outlet line 204 is applied to the other end of the valve 208 via line 212 and orifice 214. The valve 208 is biased towards the orifice 214 by spring 216. The valve 208 can selectively connect crankcase line 206 either to the inlet 202 via line 218 or to the outlet 204 via line 212.

Crankcase line 206 also is connected to the inlet line 202 via an orifice 218 and a relief valve 220. The relief valve 220 normally is biased closed and is regulated by the pressure differential between the crankcase line 206 and the inlet line 202. By use of the relief valve 220, the crankcase orifice 218 can be sized much smaller than in a conventional circuit.

Figure 6:
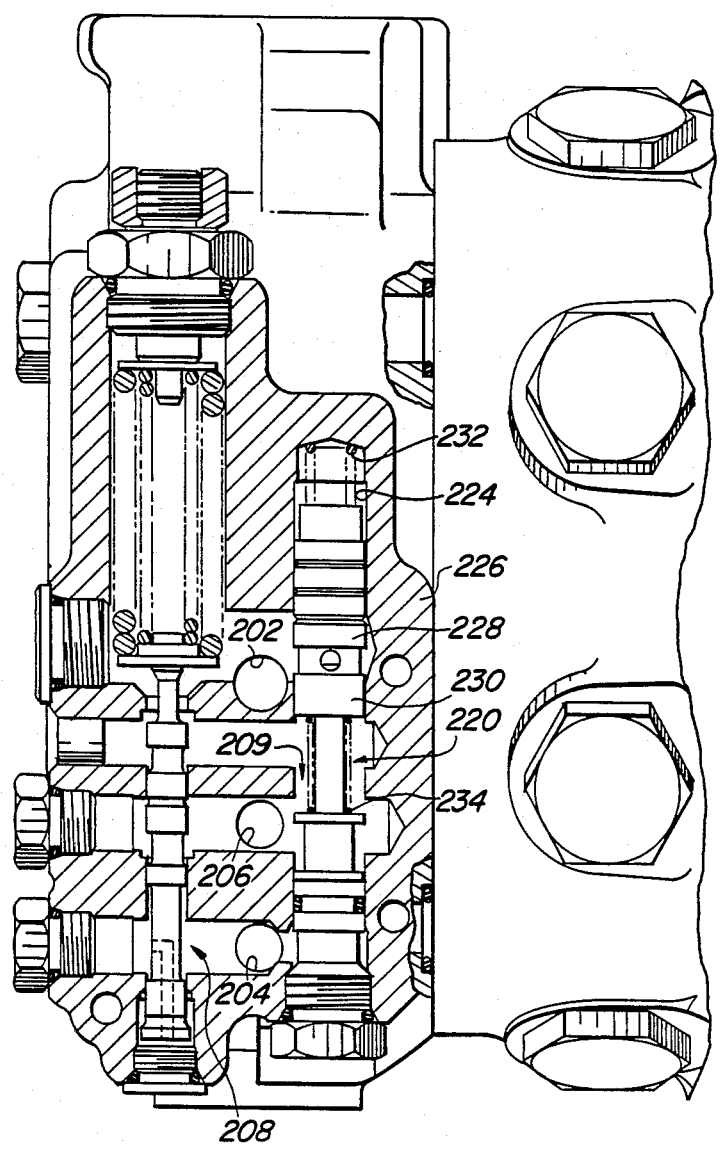
FIG. 6 is a cross-section of a valve embodying a portion of the schematic of FIG. 5.

FIG. 6 illustrates a compact valve body embodying the portion of the circuit shown in FIG. 6 in dashed lines 222. As seen in the figure, the right spool valve is the relief valve 220, while the left spool valve is the control valve 208. The valve 208 is substantially identical to the valve 38 depicted in FIG. 2, and therefore will not be described further here, except to note that the opening 209 effectively converts the valve to a three-port, rather than a four-port, valve.

The relief valve 220 is formed by a valve bore 224 formed in valve body 226 and having a spool 228 therein. Valve spool 228 has a land 230 formed thereon to engage the inner surface of valve bore 224. The top side of land 230 is exposed to the inlet pressure, while the bottom side of land 230 is exposed to the crankcase pressure. Springs 232, 234 combine to position the land 230 in approximately the position shown. As may be seen, upon a large increase in pressure in the crankcase line 206, the land 230 will be pushed upwards in the figure, opening the valve bore 224 to allow fluid flow from crankcase line 206 to input line 202.

Referring again to FIG. 5, in operation a high flow to the load will produce a low pressure in outlet line 204, which in turn will allow the spring 216 to move the valve 208 to the right, as shown in FIG. 5. This will connect the crankcase line 206 to the inlet 202 via line 218, putting the pump 200 into full stroke. As the outlet pressure increases, the valve 208 will shift to the left, de-stroking the pump 200. If the outlet pressure increases too far, the relief valve 220 will open, connecting the crankcase line 206 to the inlet line 202.

While the present invention has been described with reference to the particular embodiments thereof, it is to be understood that various modifications thereto would be readily apparent to one of ordinary skill in the art. Accordingly, the scope of the present invention is in no way intended to be limited by this description, but only by the following claims.

We claim:

1. A control circuit for a variable displacement pump having an inlet, an outlet connected to a load and a control line, said circuit comprising:

a load sense valve having a first port connected to the pump control line, a second port connectible to the pump inlet and a third port connected to the pump outlet, said load sense valve having one position connecting said first port to said second port and another position connecting said first port to said third port;

a load sense line having a pressure therein representative of the pressure supplied to the load;

means for controlling the position of said load sense valve based on the pressure differential between said pump outlet and said load sense line;

a pressure-compensator valve having a first port connected to said load sense valve second port, a second port connected to said load sense valve first port, a third port connected to said pump inlet and a fourth port connected to said pump outlet, said pressure-compensator valve having one position connecting its first and third ports while blocking communication between its second and fourth ports, and having another position blocking communication between its first and third ports while connecting its second and fourth ports;

means for controlling the position of said pressure-compensator valve based on the pressure differential between said pump inlet and outlet;

flow limiting orifice means connecting said pump control line and said load sense valve first port;

check means connected in parallel to said orifice means, said check means allowing flow therethrough from said pump control line towards said load sense valve first port, while blocking flow therethrough from said load sense valve first port towards said pump control line; and a relief valve for connecting said load sense valve first port to said pump inlet when the pressure differential therebetween exceeds a predetermined maximum.

2. The circuit of claim 1, wherein each of said valves is infinitely variable.

3. The circuit of claim 1, wherein each of said valves comprises a pilot operated spool valve.

4. The circuit of claim 1, wherein said pump is a radial piston pump, and said circuit further comprises second flow limiting orifice means connecting said pump inlet and control line.

5. The circuit of claim 1, further comprising flow limiting means for slowing the rate of response of said pressure-compensator valve control means.

6. A control valve for a variable displacement pump having an inlet, an outlet connected to a load and a control line, and wherein a load sense line is provided having a pressure therein representative of the load on the pump, said valve comprising:

a valve body having formed therein:
(i) first, second and third spool bores, one end of said first spool bore being connected to said load sense line;
(ii) first, second and third cross-bores interconnecting said first and second spool bores, said third cross-bore being connected to said pump outlet;
(iii) a fourth cross-bore connected to said second spool bore; and
(iv) fifth and sixth cross-bores, said fifth cross-bore connecting said fourth cross-bore with said third spool bore and said pump inlet, and said sixth cross-bore connecting said second cross-bore with said third spool bore and said pump control line;

a load sense spool in said first spool bore and having first and second lands formed thereon, said first land serving selectively to at least partially block said first spool bore between said first and second cross-bores and said second land serving selectively to at least partially block said first spool bore between said second and third cross-bores, one end of said load sense spool being exposed to the pressure in said load sense line and the other end of said load sense spool being exposed to the pressure at said pump outlet;

a pressure-compensator spool in said second spool bore and having first, second and third lands formed thereon, said first land serving selectively to at least partially block said second spool bore between the fourth and first cross-bores, said second land serving selectively to at least partially block said second spool bore between said first and second cross-bores, and said third land serving selectively to at least partially block said second spool bore between said second and third cross-bores, one end of said pressure-compensator spool being exposed to the pressure at said pump inlet and the other end of said load sense spool being exposed to the pressure at said pump outlet;

a relief spool in said third spool bore and having a land formed thereon serving to selectively to at least partially block said third spool bore between said fifth and sixth cross-bores; and check-orifice means in said sixth cross-bore for allowing free flow therethrough from said pump inlet towards said second cross-bore and for allowing limited flow therethrough from said second cross-bore towards said pump inlet.

7. The control valve of claim 6, further comprising a seventh cross-bore connecting said third cross-bore to said pump outlet.

8. The control valve of claim 6, wherein said pressure-compensator spool has a flow limiting passage formed therein for conveying the pressure at said pump outlet from said third cross-bore to said pressure-compensator spool other end.

9. The control valve of claim 6, wherein said check-orifice means comprises a multi-legged body movable between a position allowing free flow through said sixth cross-bore and a position allowing only restricted flow between said legs and said sixth cross-bore.

10. The control valve of claim 6, further comprising spring means in each of said spool bores for biasing the respective spools.

11. The control valve of claim 10, wherein said spring means in said second spool bore is adjustable.

12. A control circuit for a variable displacement pump having an inlet, an outlet connected to a load and a control line, said circuit comprising:

pressure-compensator valve having a first port connected to the pump control line, a second port connected to the pump inlet and a third port connected to the pump outlet, said valve having one position connecting said first port to said second port and another position connecting said first port to said third port;

control means for controlling the position of said valve based upon the pressure differential between only said pump inlet and outlet pressure; and relief means for connecting said first port to said pump inlet when the pressure differential therebetween exceeds a predetermined minimum.

13. The circuit of claim 12 wherein said valve is infinitely variable.

14. The circuit of claim 12 further comprising flow limiting means for slowing the rate of response of said control means.

15. The circuit of claim 12, wherein said pump is a radial piston pump and said circuit further comprises flow limiting orifice means connecting said pump inlet and control line.

16. A control valve for a variable displacement pump having an inlet, an outlet connected to a load and a control line, said valve comprising:

a valve body having:
(i) first and second spool bores formed therein; and (ii) first, second, third and fourth cross-bores formed therein, said first, second and third cross-bores interconnecting said spool bores, and said first cross-bore being connected to said pump inlet, said third cross-bore to said pump control line and said fourth cross-bore to both said pump outlet and said first spool bore;

a pressure-compensator spool in said first spool bore and having first, second and third lands formed thereon, said first land serving selectively to at least partially block said first spool bore between said first and second cross-bores, said second land serving selectively to at least partially block said first spool bore between said second and third cross-bores, and said third land serving to at least partially block said first spool bore between said third and fourth cross-bores, the ends of said pressure-compensator spool being exposed to the pressure at the pump inlet and outlet, respectively; and a relief spool in said second spool bore and having a land formed thereon serving selectively to at least partially block said second spool bore between said first and second cross-bores.

17. The control valve of claim 16, further comprising fifth, sixth and seventh cross-bores, said fifth, sixth and seventh cross-bores connecting said first, third and fourth cross-bores to said pump inlet, control line and outlet, respectively.

18. The control valve of claim 16, wherein said pressure-compensator spool has a flow limiting passage formed therein for conveying the pressure at said pump outlet from said fourth cross-bore to the end of said pressure-compensator spool exposed thereto.

19. The control valve of claim 16, further comprising spring means in each of said spool bores for biasing the respective spools.

20. The control valve of claim 19, wherein said spring means in said first spool bore is adjustable.

* * * * *